United States Patent [19]
Barnes et al.

[11] Patent Number: 5,690,898
[45] Date of Patent: Nov. 25, 1997

[54] PROCESS FOR TREATING EFFLUENT FROM A SUPERCRITICAL WATER OXIDATION REACTOR

[75] Inventors: Charles M. Barnes; Carolyn Shapiro, both of Idaho Falls, Id.

[73] Assignee: The United States of America as represented by the United States Department of Energy, Washington, D.C.

[21] Appl. No.: 433,301

[22] Filed: May 3, 1995

[51] Int. Cl.[6] .................................................. B01D 47/00
[52] U.S. Cl. .................. 423/210; 423/235; 423/245.1; 423/242.1; 95/60; 95/67; 95/92; 55/267; 55/315; 55/343
[58] Field of Search ................................. 423/220, 235, 423/210, 240 R, 242.1, 245.1, 215.5; 95/57, 92, 90, 288, 70, 68, 67, 230, 237, 60; 55/315, 337, 319, 338, 342, 267, 343

[56] References Cited

U.S. PATENT DOCUMENTS

| | | | |
|---|---|---|---|
| 4,720,422 | 1/1988 | Higuchi et al. | 428/252 |
| 4,750,916 | 6/1988 | Svensson | 55/5 |
| 4,869,890 | 9/1989 | Adams et al. | 423/392 |
| 5,030,423 | 7/1991 | Obee et al. | 422/122 |
| 5,384,051 | 1/1995 | MgGinness | 210/422 |
| 5,387,398 | 2/1995 | Mueggenburg et al. | |
| 5,397,549 | 3/1995 | Newman | 423/235 |

OTHER PUBLICATIONS

Felder et al., Elementary Principles of Chemical Processes, New York:John Wiley&Sons, p. 106, 1978.
Supercritical Water Oxidation Test Bed Effluent Treatment Study, C.M. Barnes, EGG-WTD-11271, May 4, 1994.

Primary Examiner—Deborah Jones
Assistant Examiner—Amy M. Harding
Attorney, Agent, or Firm—Joy Alwan; Robert J. Fisher; William R. Moser

[57] ABSTRACT

A method for treating a gaseous effluent from a supercritical water oxidation reactor containing entrained solids is provided comprising the steps of expanding the gas/solids effluent from a first to a second lower pressure at a temperature at which no liquid condenses; separating the solids from the gas effluent; neutralizing the effluent to remove any acid gases; condensing the effluent; and retaining the purified effluent to the supercritical water oxidation reactor.

20 Claims, 6 Drawing Sheets

PROCESS FOR TREATING EFFLUENT FROM A SUPERCRITICAL WATER OXIDATION REACTOR

The United States government has rights in this invention pursuant to contract No. DE-AC07-76ID01570 between the United States Department of Energy and EG&G Idaho, Inc.

BACKGROUND OF THE INVENTION

The present invention relates generally to a method for treating and recycling the effluent from a supercritical water oxidation reactor and more specifically to a method for treating and recycling the effluent by expanding the effluent without extensive cooling.

Supercritical water oxidation is the oxidation of fuel, generally waste material, in a body of water under conditions above the thermodynamic critical point of water. Water at supercritical conditions has a density of about one-tenth that of liquid water, and exhibits properties similar to those of a dense gas, including miscibility with organics and combustion gases in all proportions. These qualities result in a single phase reaction medium containing water, organics and oxidizers, allowing oxidation to proceed without the need for mass transport across an interface. As a single phase reaction medium, supercritical water provides high operating efficiency at lower temperatures and less pollutants in the effluent.

The current state of the art in supercritical water oxidation plant effluent treatment is to cool the reactor effluent through heat exchangers or direct quench, separate the cooled liquid into a gas/vapor stream and a liquid/solid stream, expand the separated effluent, and perform additional purification on gaseous, liquid, brine and solid effluent. As the supercritical fluid is cooled, it's density gradually increases and water condenses. If the effluent was 100% water the density would increase 10–15 times and the fluid would become liquid without going through a phase boundary. In the real world oxygen and carbon dioxide would be present and the fluid would become mixed phase as it cools. If acid gases are present, corrosion is likely to occur in the coolers. During expansion, part of the condensed water will revaporize. Vaporization can damage the valves due to cavitation and erosion.

A need exists in the art for a method to treat the effluent of a SCWOR efficiently and without damage to the treatment equipment. The present invention satisfy this need by expanding the effluent stream without condensing the stream. Radionuclides and suspended solids are more efficiently separated in the vapor phase. Condensed acids in the liquid phase are highly corrosive. By preventing condensation, the acids are kept in the much less corrosive gaseous phase thereby limiting the damage to treatment equipment. The present invention also reduces the external energy consumption, by utilizing the expansion step to also cool the effluent.

SUMMARY OF THE INVENTION

It is an object of the invention to provide a method of treating the effluent of a supercritical water oxidation reactor (SCWOR) that overcomes many of the disadvantages of the prior art.

It is an object of the invention to provides a method for expanding the effluent of a SCWOR without condensing the effluent.

It is an object of the invention to increase the efficiency of separation of radionuclides and other suspended solids from the effluent stream.

It is an object of the invention to reduce the corrosion of effluent treatment equipment by decreasing the condensation of acid gases.

It is a further object of the invention to reduce the amount of high pressure equipment needed to treat SCWOR effluent.

It is a further object of the invention to reduce energy costs by using expansion to cool the effluent.

Additional objects, advantages and novel feature of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

These and other objectives are obtained by providing a method to treat the effluent of a SCWOR efficiently and without damage to the treatment equipment. The present invention treats the effluent by expanding the effluent stream without condensing the stream, filtering the solids from the effluent, neutralizing acid gases in the effluent, condensing the remaining effluent, and then returning the treated effluent to the reactor. Radionuclides and suspended solids are more efficiently separated in the vapor phase. Condensed acids in the liquid phase are highly corrosive. By preventing condensation, the acids are kept in the much less corrosive gaseous phase thereby limiting the damage to treatment equipment. The present invention also reduces the external energy consumption, by utilizing the expansion step to also cool the effluent.

BRIEF DESCRIPTION OF THE DRAWINGS

The accompanying drawings, which are incorporated in and form part of the specification, illustrate the present invention and, together with the description, serve to explain the principals of the invention.

DETAILED DESCRIPTION OF THE INVENTION

Figure 1:
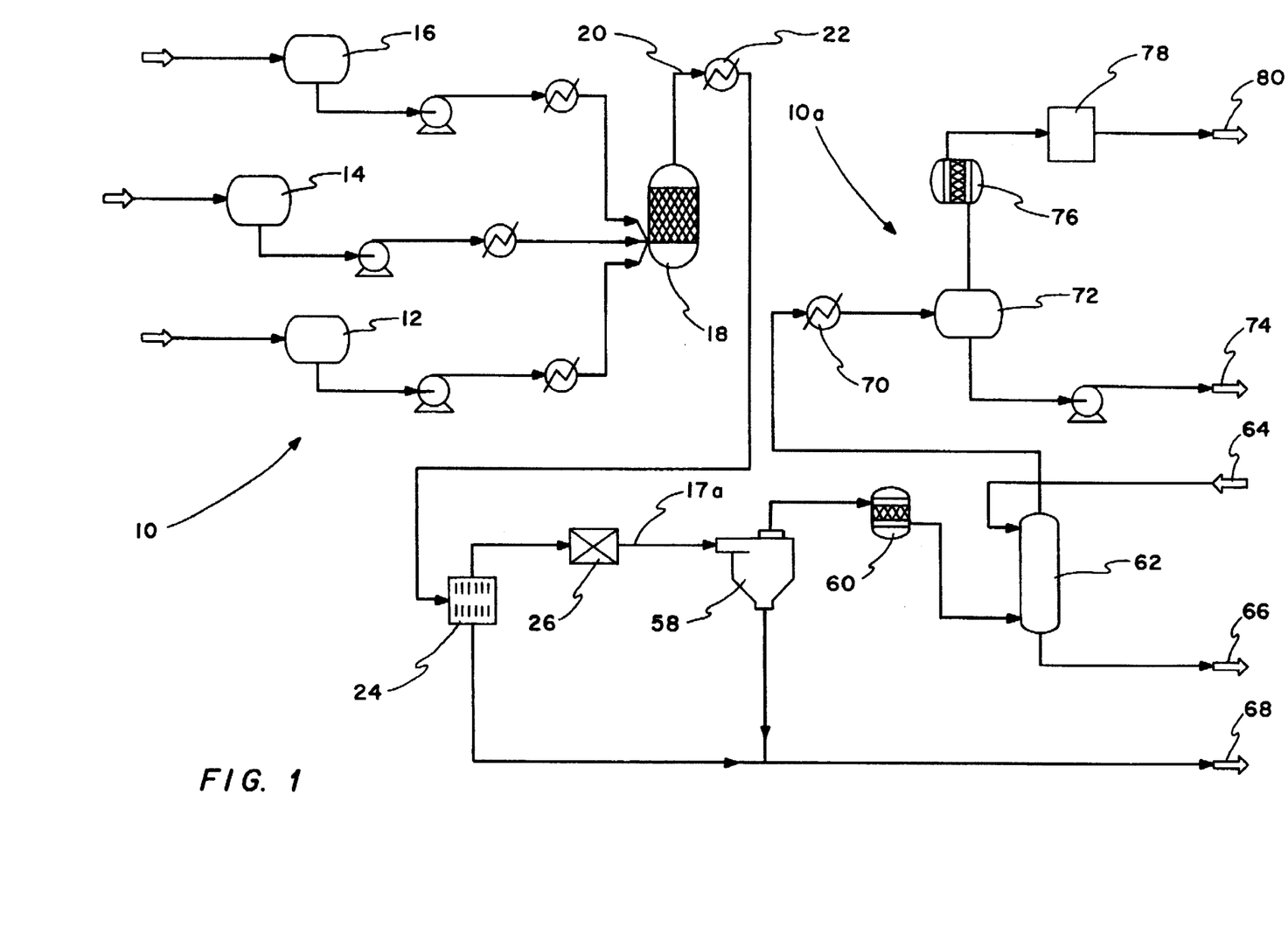
FIG. 1 is a schematic diagram of a supercritical water oxidation system.
Figure 2:
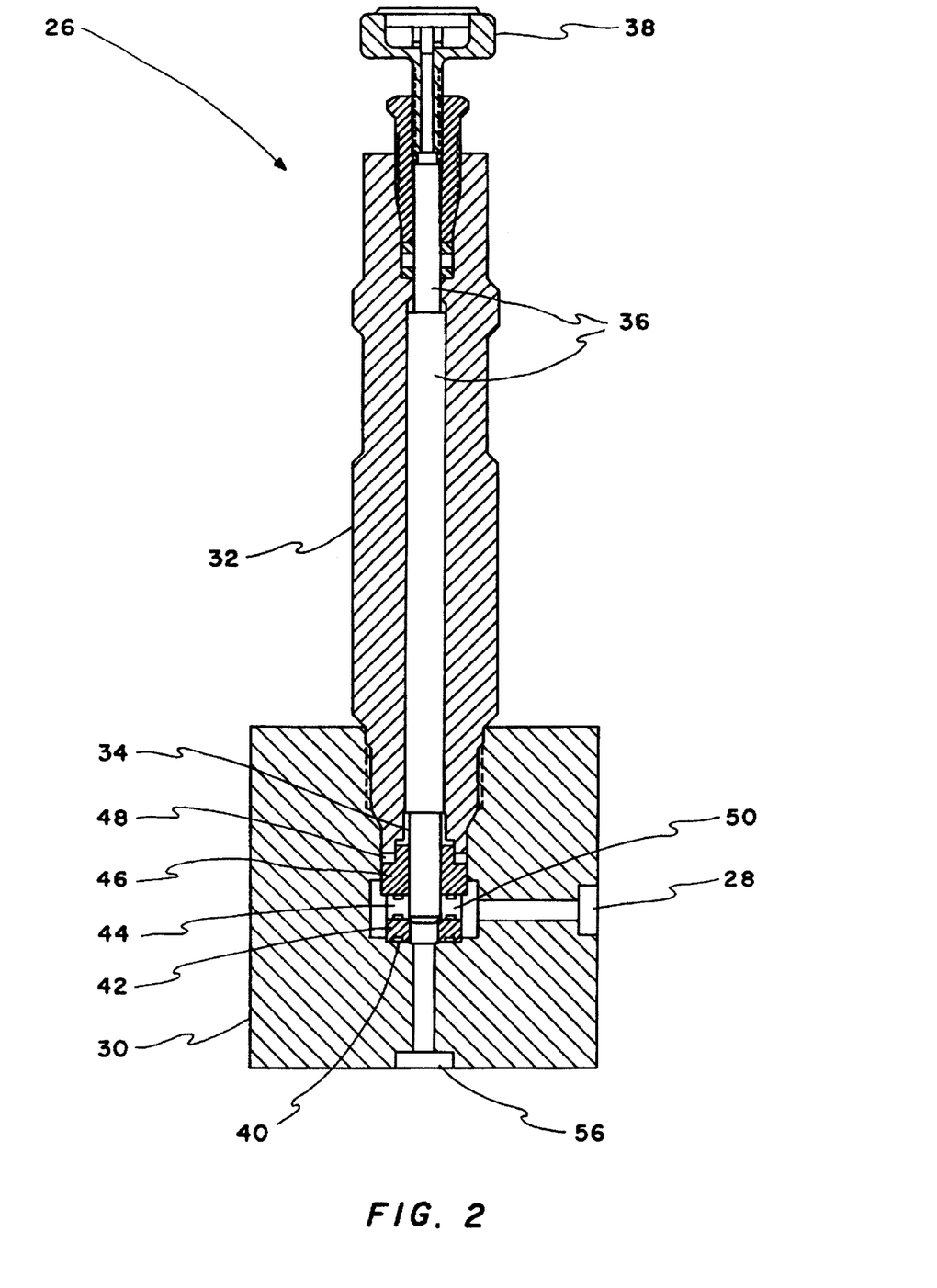
FIG. 2 is a cut away side view of a control valve from the system of FIG. 1.
Figure 3:
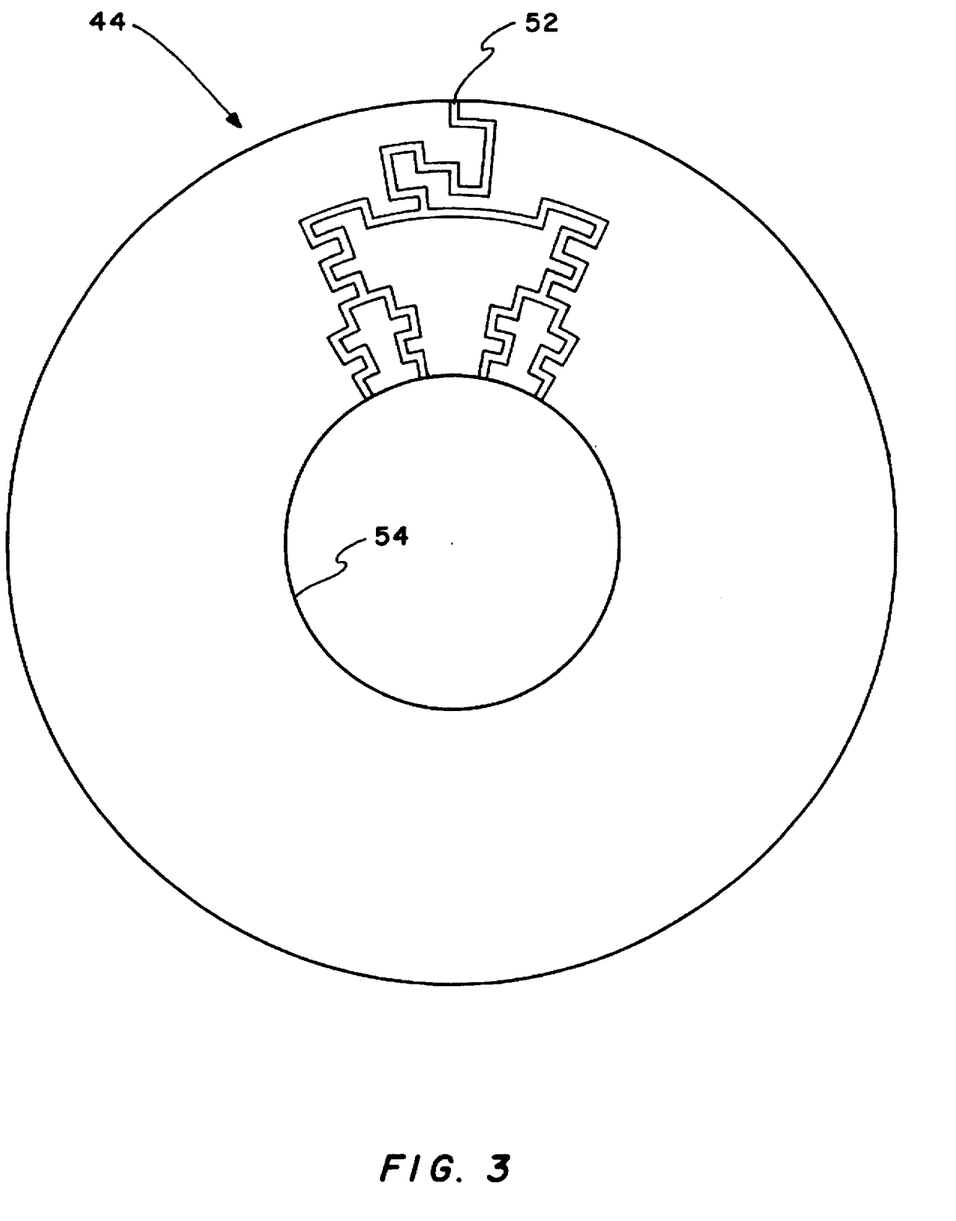
FIG. 3 is cross sectional view of a disk showing the baffled passageway from the valve in FIG. 2.

FIGS. 1, 2, and 3 illustrate the preferred embodiment of the invention. Water is introduced into the system 10 from the water feed tank 12 to the reactor vessel 18. Oxygen is introduced into the reactor vessel from the oxygen feed tank 14, and mixed wastes are introduced from the waste feed tank 16. In the reactor vessel 18 mixed wastes are oxygenated in a body of water at supercritical conditions. Water at supercritical conditions is miscible with organics and combustion gases in all proportions. Also at supercritical conditions many compounds are in solid form which would be dissolved in water at milder conditions. The effluent exiting the reactor is composed of entrained gases, water vapor, and entrained solids.

The effluent 20 from the reactor vessel 18 flows into an effluent treatment system 10a. The effluent is passed through a cooling device 22, i.e. a shell and tube heat exchanger or direct quench with water or another fluid, to lower the temperature to about 450° C. but not low enough to cause condensation of the vapor. From the cooling device, the effluent passes through a filter 24 to remove solids. The removed solids are transported to the solids outlet 68 for further processing into a stabilized waste form.

The filtered effluent is passed through a control valve 26 where the effluent is expanded and cooled from about 3500 psia and 450° C. to about 250°–300° C. and 200–300 psia. Expanded effluent enters a separator 58 where additional solids are removed. The removed solids are transported to the solids outlet 68 for further processing into a stabilized waste form. The gas/vapor phase of the effluent is transported from the separator to a mercury guard bed 60 to remove trace mercury in the phase. From the guard bed the gas/vapor phase is transported to a gas scrubber 62. Caustic solution is pumped through the caustic inlet 64 to neutralize the acid in the gas/vapor phase. The neutralized salts and remaining caustic are transported to the brine outlet 66 for further treatment. The neutralized gas/vapor phase is transported to the condenser 70 where the water is condensed. The condensed water is held in an accumulator tank 72 and then returned to the water feed tank 12. The treated gas passes through the accumulator to a carbon bed 76 for removal of trace organics and a high efficiency particulate (HEPA) filter 78 to remove trace particulate matter. It is then vented through the gas outlet 80. FIGS. 2 and 3 illustrate the control valve 26. Valve 26 includes a valve body 30 within an attached bonnet 32 enclosing a valve stem 36 adapted with an end spindle 34. Spindle 34 is received within a central opening 54 within each disk 52 of disk stack 50 which is positioned in a central cavity of the valve body 30. The disks of disk stack 50 are compressed in place to prevent leakage by O-ring 40, seat ring 42, bushing 46, and packing 48. The spindle 34 is raised and lower to increase or decrease the number of disks 44 exposed to the flow of the effluent by handle 38 attached to valve stem 36.

Effluent at pressures of about 3500 psia and 450° C. enters the control valve body assembly 30 through the inlet 28. The entering effluent passes through baffled passageways 52 in each disk 44 of stack 50. Each baffled passageway consists of multiple splits and right angle turns. The splits and turns expand the effluent and minimize high velocity changes that could result in local condensation within the valve. As the effluent expands in the splits and turns, it cools. At the control valve outlet 56 the effluent has been typically expanded to 200–300 psia and cooled to 250°–300° C. at which pressure and temperature no condensate is formed in the control valve 26.

Figure 4:
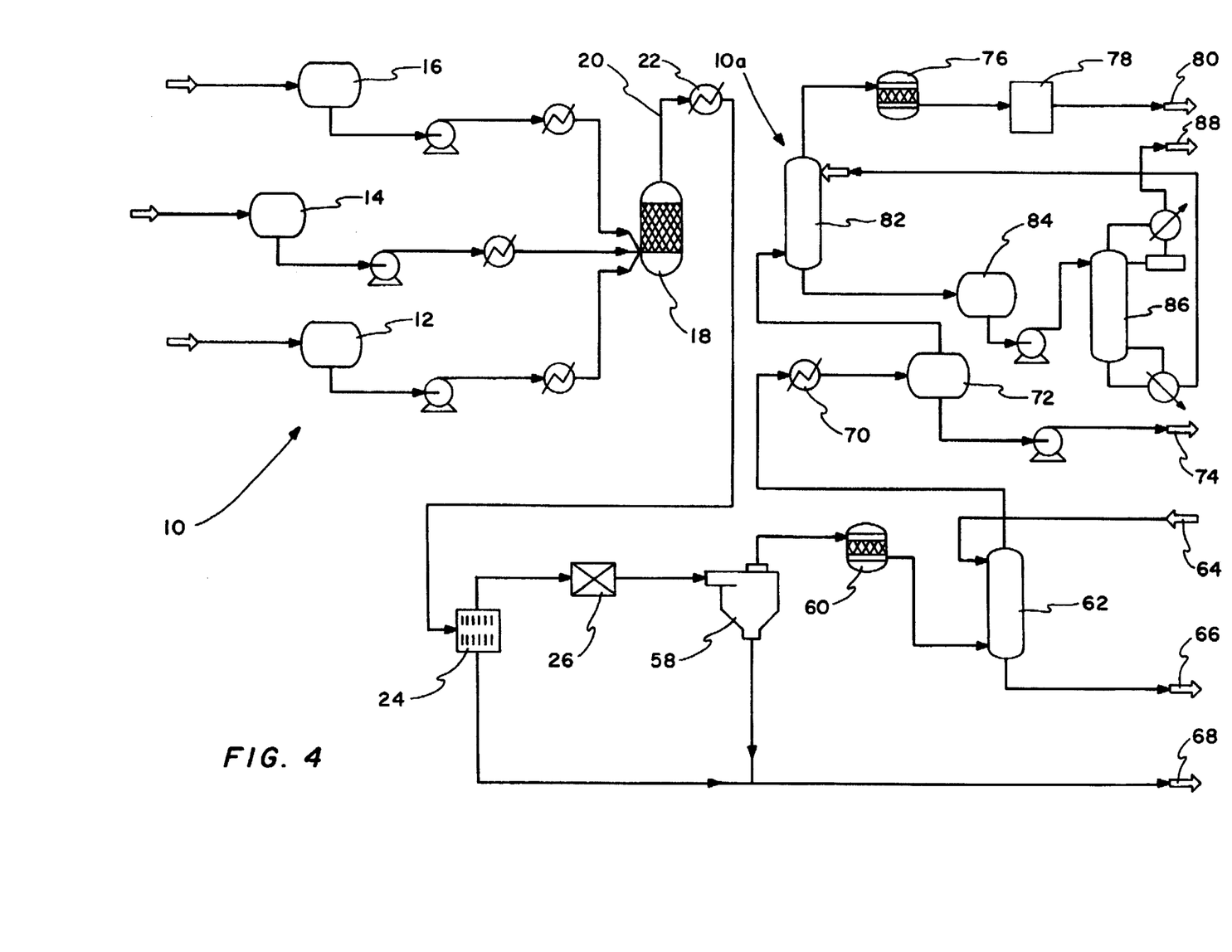
FIG. 4 is a schematic diagram of the system showing alternative treatment steps.

In an alternate embodiment of the method shown in FIG. 4, the treated gas is passed from the accumulator tank 72 to a carbon dioxide absorber 82 to remove carbon dioxide from the gas. In the absorber, carbon dioxide is absorbed into a liquid solvent such as monoethanolamine, water, or an aqueous solution of potassium carbonate. The carbon dioxide free gas then passed to the carbon bed 76 and HEPA filter 78. The carbon dioxide rich gas solvent flows from the bottom of the absorber 82 to a holding tank 84. The holding tank provides adequate time to analyze the carbon dioxide and determine whether it can safely be released to the atmosphere. In treatment of mixed waster the possibility will exist for a portion of the carbon dioxide to be radioactive. If no radioactive carbon is present, the solvent is stripped of carbon dioxide in the stripper 86 and then released to the atmosphere. If analysis shows radioactivity, the carbon dioxide is further processed to obtain a stabilized solid form.

Three test series were conducted on a bench scale system. The first series, runs 1 & 2, was a start up phase that consisted of feeding mixtures of water and nitrogen to the control valve, illustrated as 26 in FIGS. 1 and 4, in order to establish operating parameters for the valve. In the second series, runs 3–12, solids were added to the water in order to test the ability of the valve to handle solids. The concentration and type of solids were varied. Titanium dioxide was used as an example of a nonsticky solid and also because its white powder illustrated the flow path. Sodium chloride and sodium sulfate were used to determine the valve's ability to handle sticky solids. In the third test series, runs 16–22, HCl was added to the water in concentrations of 400 ppm, 1500 ppm, and 3100 ppm. These concentrations are equivalent to a pH of 2.0, 1.4, and 1.2 respectively. In this series, runs were made with nitrogen and compressed air to determine the effect of oxygen on corrosion in the valve trim. Following each run the control valve was disassembled and inspected for evidence of solids build up and corrosion.

The following briefly describes the test runs that were made and are offered merely as examples of operating conditions in the method of the present invention:

| RUN | DESCRIPTION |
|---|---|
| 1 | Initial start-up run with water. Ran 1.5 hours. No data logged. |
| 2 | Second run with water. |
| 3 | Ran for about 4 hours with water, then switched to feed with 100 ppm titanium dioxide and ran for about 1.5 hours. |
| 4 | Ran for 2.5 hours on water, then switched to feed with 300 ppm titanium dioxide. |
| 5 | Total run time about 4.5 hours, of which 1.5 hours was on 100 ppm sodium chloride. |
| 6 | 100 ppm NaCl for 6.5 hours at temperature. |
| 7 | 300 ppm NaCl for 5.5 hours at temperature. |
| 8 | 1000 ppm NaCl for 5 hours at temperature. |
| 9 | Ran with water for about 3 hours to check system operation at higher temperatures and no gas flow. |
| 10 | 1000 ppm sodium sulfate for 3 hours. |
| 11 | 3 hours on water, 3.5 hours on 300 ppm NaCl. Fluid temperature measured upstream of valve. |
| 12 | NaCl concentration stepped up from 300 to 1000 to 5000 to 10,000 ppm over 6 hour run. |
| 16 | Ran with 400 ppm HCl for 1 hour at temperature. |
| 17 | Continuation of run 16 for an additional 4.5 hours with nitrogen and 400 ppm HCl. |
| 18 | 5 hours with nitrogen and 3100 ppm HCl. |
| 19 | 5 hours with nitrogen and 1500 ppm HCl. |
| 20 | 5 hours with air and 1500 ppm HCl. |
| 21 | 1 hour at temperature with air and 1500 ppm HCl. |
| 22 | Continuation of run 21; leak at flange after 1 hour at temperature with air and 1500 ppm HCl. |

Two tests, runs 3 and 4, were made using titanium dioxide particles in the feed water and the valve appears to have performed well under the conditions of these tests. The solid particles ranged from 0.2 to 10 microns, with 50% being less than 0.5 microns, and 85% being less than 1 micron. It was expected that if solids began plugging flow passages of the valve, an increase in the upstream pressure would be seen, and no such increase was seen beyond the normal fluctuations without solids present. That solids did pass through the valve was confirmed by seeing white solids in the waste tank and in the passageways of the valve upon disassembly. An attempt was made to filter the waste in order to quantify the solids that had passed through the valve, but the submicron size of the solids prevented capturing them on filter paper. Based on the flowrate of the pump, time of operation on solids, and the concentration of solids in the feed, a maximum of 3.3 grams of titanium dioxide passed through the valve.

Examination of the control valve disks following the runs with titanium dioxide revealed white material in the passageways of all the disks. The solids appeared to fill the small passageways, yet without blocking flow. Solids appear to be relatively loose rather than packed into the passageways. That they were found in all disks shows that flow was going through all disks, in spite of the valve being open a small mount. A small build up of solids was seen on the end of the spindle.

Solutions of sodium chloride and sodium sulfate were used to evaluate the ability of the valve to handle sticky solids. In general, the valve was able to handle sodium chloride mixtures without plugging, with the salt dissolved in the liquid phase, in the supercritical phase, in two-phase liquid/gas, or in a solid/gas phase. On two of the five major sodium chloride runs some evidence of plugging of the valve was seen.

Figure 5:
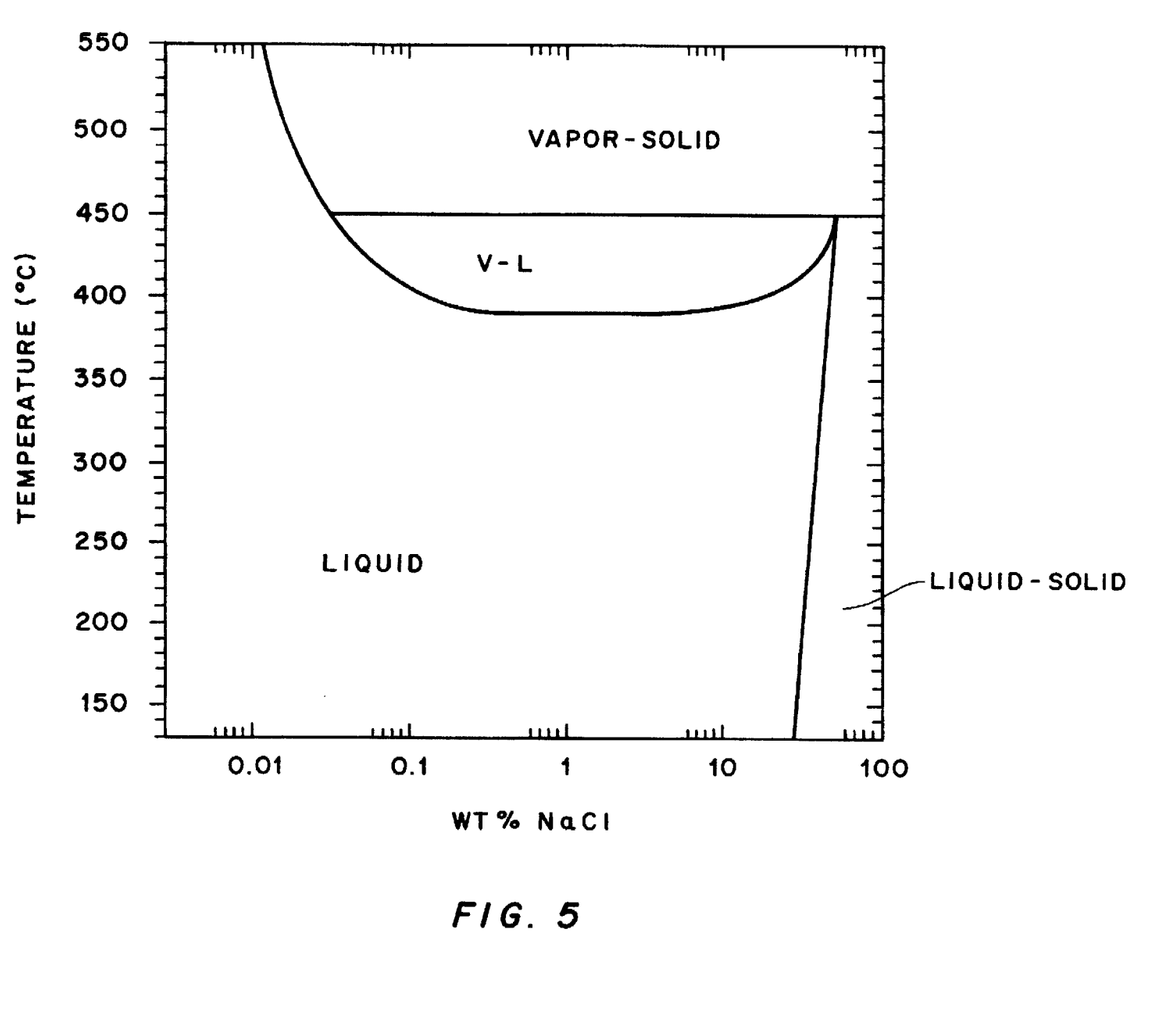
FIG. 5 is a phase diagram for sodium chloride and water at 3500 psia.

A phase diagram for sodium chloride-water at 250 bar (3500 psia) is shown in FIG. 5, taken from recent work by Armellini, Hong, and Tester incorporated herein by reference. The phase diagram shows that solid sodium chloride precipitates only at temperatures greater that 450° C., for solutions up to 30 wt % NaCl. From 390° to 450° C., a vapor-liquid two phase region exists. The upper left hand side of the phase diagram, though part of the region labeled liquid, is a supercritical region, and if NaCl was added to a fluid at, say, 500° C., such that its concentration increased from 0.01 to 0.1 wt % NaCl, the phase boundary line which would be crossed does not signify a change in the aqueous phase which remains supercritical, but indicates precipitation of sodium chloride.

The most severe test of the valve with sodium chloride occurred during test run 12. For this test the fluid temperature was measured upstream of the control valve. The system was brought up to temperature while flowing water, and when the fluid temperature reached 420° C., valves were switched to change from water to a feed solution of 300 ppm sodium chloride. Changes in feed flowrate caused fluctuation in fluid temperature within the range of 400° to 5100° C. over the next 1.3 hours. No evidence of plugging was seen.

The salt concentration was then increased to 1000 ppm and shortly thereafter the liquid flow was reduced from 1.1 to 1.0 gph. Because of the reduced flow the temperature increased from 385° C. to a steady state value of about 500° C. During 1.5 hours of this 2.1 hour period, the temperature was greater than 450° C. which, according to the phase diagram, would indicate being in the solid/vapor phase region. Again no evidence of plugging was seen, based on the pressure upstream of the valve remaining relatively constant. During this time, the nitrogen concentration was also varied from about 20 wt % to zero. With no nitrogen flowing, the fluid temperature decreased and was brought back up to 490° C. by a further reduction in liquid flow. After reaching steady state temperature profiles, the salt concentration was then increased to 5000 ppm, holding the fluid temperature at 480°–490° C. for 1.5 hours. For the final 1.5 hours of the run, the sodium chloride concentration was increased to 10,000 ppm (1%) and the fluid temperature was 480°–510° C. No evidence of plugging the valve was seen.

In order to leave solids in the valve, the system was brought down in temperature and pressure on nitrogen only. The salt solution feed was stopped, with nitrogen flowing through the system to dry out the salt in the valve without redissolving it. Later disassembly showed that the tee that contained the thermocouple measuring fluid temperature was filled with solids, so much so that the thermocouple sticking into the fluid was bent in the direction of flow about 0.3 inch. The valve outlet was also filled with solids for at least two inches in length. Examination of the disks showed free flow paths in 10 of 16 disks. Solids in many passageways appeared loose or porous. Coming down on nitrogen effectively brought the salt concentration from 1 to 100 percent, based on a salt in water concentration. Based on nitrogen flow, the salt concentration reached a maximum of about 8% by weight.

Analysis of samples discharging from the separator did not show levels of NaCl that corresponded to feed concentrations nor did they increase with time:

TABLE I

| Time of Sample | Sodium Concentration of Sample as NaCl (ppm) | Feed concentration 45 min. prior to taking sample |
| --- | --- | --- |
| 3.1 hr into run | 49 | 1000 |
| 4.2 hr into run | 66 | 1000 |
| 5.2 hr into run | 39 | 5000 |
| 6.3 hr into run | 36 | 5000 |

The above table shows the feed concentration at 45 minutes prior to the time of taking the sample, which is the approximate residence time of the fluid from the feed tank to the separator outlet. Thus, a large percentage of the NaCl deposited in the system. The relative amounts deposited upstream and downstream of the valise were not measured. A rough estimate based on observation during disassembly and cleaning is 70% upstream and 30% downstream of the valve.

Three runs of longer duration with sodium chloride of various concentrations were also successful, runs 6–8. Each of these runs were 5–6.5 hours in length, and, apart from a brief period for two of the runs in which temperatures were raised, were stable throughout the run with no evidence of plugging. For these runs, the fluid temperature was measured downstream of the control valve. Because of the two periods of instability seen in these runs, they are discussed in detail.

In the first hour of run 8 after introducing 1000 ppm NaCl, the fluid temperature increased from 205° to 280° C. and then decreased to 260° C. as the system reached steady state temperatures, and adjustments in the feed solution flowrate were made. Assuming constant enthalpy across the valve, these outlet temperatures imply valve inlet temperatures of 430° to 460° C., and 450° C., respectively. Over the next 2.5 hours, operating conditions remained very steady, with the fluid temperature fluctuating in the range 255°–270° C., and the upstream pressure showing only minor fluctuations and a slight decreasing trend. Only one adjustment of the control valve was made over this period. Based on constant enthalpy calculations for pure water, the upstream temperature for this steady state period was approximately 450°–457° C.

The NaCl solution flowrate was then decreased from 1.1 to 0.9 gph to obtain a higher inlet temperature. Within 30 minutes, the outlet temperature had increased to 300° C., which corresponds to an inlet temperature of 470° C. Over this half hour period, many adjustments were required to the control valve to keep from exceeding an upstream pressure of 3700 psi, each adjustment opening the valve more until it was fully open. Then, the upstream pressure was remaining steady at about 3700 psi. To reduce the pressure, the flow was increased and the heaters turned off. Then, within 3 minutes, the upstream pressure fell sharply, and stable operation was obtained with the fluid temperature reaching about 250° C. During this time of stable operation, the feed remained the NaCl solution; a switch to clean water feed was not required to reduce the pressure.

Comparing the results of this run to the phase diagram (FIG. 5) suggests that during the period of steady state stable operation the actual upstream temperature was 450° C. or less, and then as the temperature was raised, the fluid entered the vapor-solid region, and solid sodium chloride formed and began clogging the passageways of the control valve. In the two-phase region, the fluid consisted of a vapor or supercritical phase saturated with approximately 300 ppm NaCl, and a very small flow, about 0.15% of the total, of a liquid phase with 40-50 wt % salt. The time required to completely plug the control valve disk passageways is calculated to be about 10 seconds, consistent with the observed rate of pressure rises in the high temperature region.

In a later run (run 12), an attempt was made to duplicate conditions that led to the apparent plugging in run 8. The following compares conditions seen in the two runs:

TABLE II

|  | Run 8 during unstable period | Run 12, during 1000-ppm NaCl |
| --- | --- | --- |
| Feed concentration | 1000-ppm NaCl | 1000-ppm NaCl |
| Feed pump stroke | 8.8 | 8.5 |
| Gas rate, SLPM | 0-10, 2.5 ave. | 0* |
| Pressure (psi) | 3540 ave. | 3590 ave. |
| Fluid temperature (upstream of valve) | 480° C. (measured) | 460-470° C. (calculated) |
| Pipe 3 temperature | 605° C. | 560-590° C. |
| Pipe 2 temperature | 405° C. | 440-450° C. |
| Pipe temperature downstream of control valve (Inconel 2) | 230° C. | 240-260° C. |

*Steady state conditions for a gas flowrate of 10 SLPM were also obtained for 1000 ppm NaCl during this run.

The above conditions do not explain why the valve appeared to plug for run 8, but not for run 12. There was one other difference between the two runs, the location of the fluid temperature thermocouple. Since solid NaCl particles were forming in both runs, locating the thermocouple upstream may have provided volume or created fluid dynamics that influenced the particle size of the precipitating NaCl particles.

Two samples of liquid from the separator were taken during run 8 and analyzed for sodium. At 3.7 hours into the run, the concentration of sodium in the separator discharge was 51 ppm, and at 5.6 hours into the run the concentration was 200 ppm.

The results from run 7, in which the feed NaCl concentration was 300 ppm, indicate that the control valve can handle solid particles in low concentrations. The run showed a gradual decrease in pressure, which closely corresponds to the decreasing temperature profile. Even though the fluid temperature of run 7 remained throughout the run in the range that brought instability in run 8, no pressure increases are seen.

The steady state fluid temperature for run 7 was 280°-290° C., corresponding to a valve inlet temperature of 461°-166° C. Assuming this upstream temperature is accurate, the fluid entering the valve consists of a supercritical phase with about 200 ppm dissolved salt, plus 100 ppm precipitated salt. No evidence of plugging was seen for this run, either in increases in the upstream pressure, or solids remaining in the valve passageways.

A brief period was seen in run 6 in which the pressure was unstable. The feed concentration of this run was 100 ppm NaCl, below the solubility of NaCl in water at operating temperatures. After about 4 hours of stable operation, the flow was reduced from 1.2 to 1 gph in order to achieve a higher temperature. The outlet temperature increased to 300° C., corresponding to an inlet temperature of 470° C. Several adjustments opening the control valve were made to keep the upstream pressure below 3700 psia. After about 15 minutes of unstable operation, the flow was increased to 1.1 gph, and stable operation was regained, with the fluid temperature at the outlet measuring 280° C., corresponding to an inlet temperature of about 460° C.

Compared to the unstable period in run 8 of 1000 ppm NaCl, valve adjustments and pressure spikes in the unstable period of the 100 ppm NaCl run were small, and the valve was not opened more than a few percent of its total stroke length.

The results from all the sodium chloride runs show that the control valve is able to handle sodium chloride solutions in the single-phase region, the vapor-liquid region, and, in some cases, the solid-vapor-phase region. Further experiments are needed to better understand the valve performance in the solid-vapor region, though run 12 demonstrates that the valve did not plug with NaCl concentration of 1000-10,000 ppm at temperatures well above the 450° C. phase boundary. Practical considerations for a full-scale SCWOR unit would likely limit the valve inlet temperature to below 450° C. in order not to exceed limitations set by materials for separation steps downstream of the valve. Thus, successful operation is expected for a full-scale unit with a drag-type control valve without plugging of the control valve even with very high sodium chloride concentrations.

Figure 6:
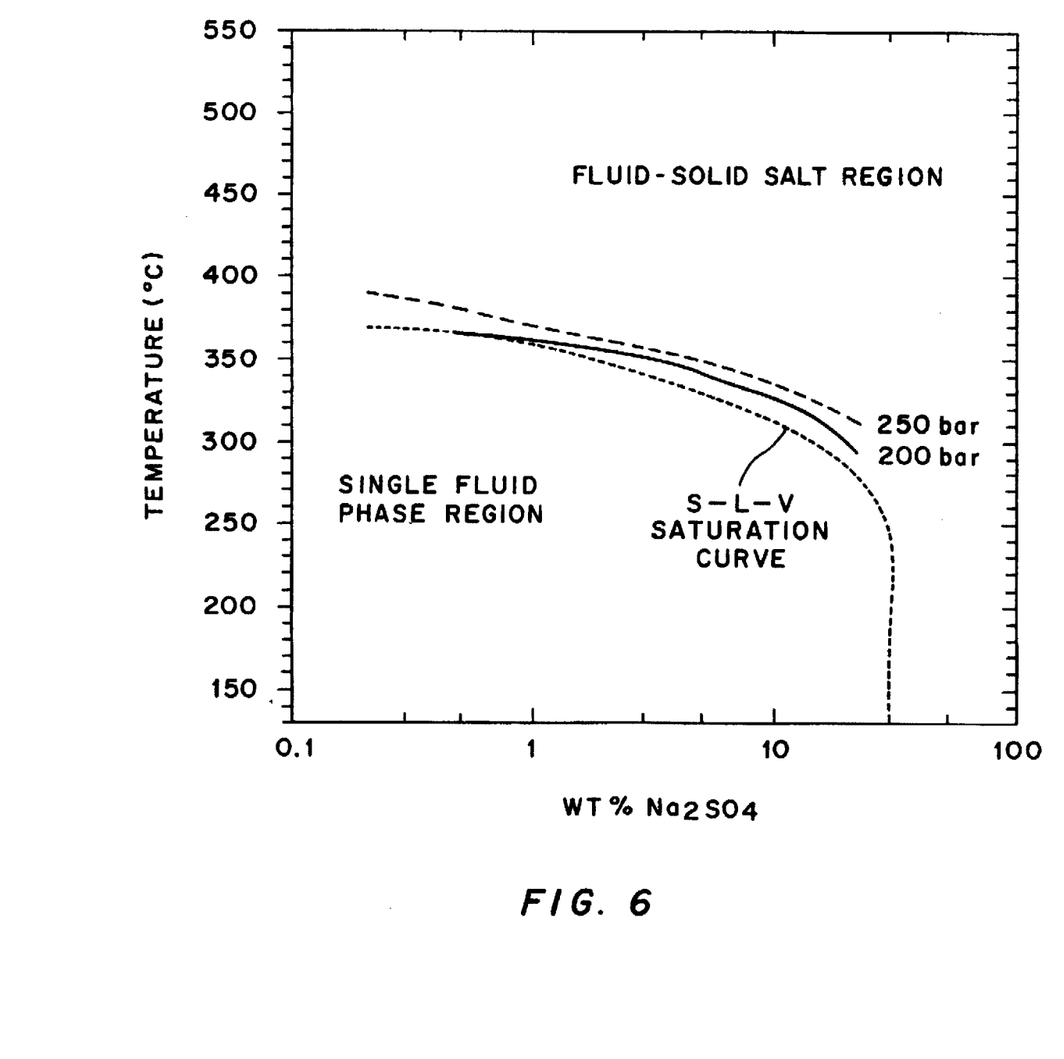
FIG. 6 is a phase diagram for sodium sulfate and water at 3500 psia.

A phase diagram for the sodium sulfate-water system is shown in FIG. 6, taken from "Precipitation of Sodium Chloride and Sodium Sulfate in Water from Sub- to Supercritical Conditions" by Armellini, Hong and Tester herein incorporated by reference. In contrast to the sodium chloride-water system, no liquid-gas two-phase region is present at a pressure of 250 bar. Only one run was made with sodium sulfate, at a concentration of 1000 ppm. Pressure and temperature profiles for this run are shown in graph B. The sodium sulfate flow began when the fluid temperature, downstream of the control valve, reached 160° C. Within 12 minutes, the downstream fluid temperature had climbed to 210° C., corresponding to a temperature upstream of the control valve of 434° C. At the same time, 12 minutes after the sodium sulfate flow was begun, the pressure upstream of the control valve began to rise sharply. Over the next 18 minutes, five adjustments were made to the control valve, progressively opening it to its fully open position. Opening the control valve resulted in reductions of the pressure upstream of the control valve, but each time, within a few seconds of the adjustment, the pressure would again begin to rise. Temperatures had remained nearly constant over this period.

With the valve fully open, the pressure upstream of the valve continued to rise, at a rate of approximately 300 psi per minute. Assuming the control valve was clogged with solids, we then switched from sodium sulfate back to pure water in an attempt to clear the passageways. Flows were switched off when the pressure reached 3700 psi and restored when the pressure had dropped to about 3100 psi. After 55 minutes, during which flows were stopped 17 times, the upstream pressure began to drop under flow conditions. During the next 30 minutes, feeding pure water and with no adjustments to the valve, which remained fully open, the pressure decreased to about 3200 psi, then increased to 3700 psi. At this point, we terminated the run and brought down the temperature on nitrogen in order to leave solids in the valve.

For this run, the control valve contained 16 disks. When disassembled, 11 disks could be removed from the spindle and examined, whereas the other 5 were too tight to be removed without rinsing. Examination of the 11 disks showed one completely free of solids and one other with a free flow path across the disk. The other 9 disks were clogged such as to prevent flow. The appearance of the passageways clogged with sodium sulfate is quite different from those clogged with sodium chloride. The white sodium sulfate appears smooth, indicating very dense packing. In contrast, sodium chloride in many of the disks from run 12 appears loose and porous. Two samples were taken of the effluent from the sodium sulfate run, which showed sodium present in concentrations of 4 and 7 ppm. This analysis confirms that very little (<0.1%) of the sodium sulfate present in the feed was able to pass through the valve.

The valve was also tested with feed solutions of hydrochloric acid. The valve trim, disks both with and without passageways, was fabricated from Inconel 718 and had been annealed prior to use. Other parts of the valve exposed to the fluid were constructed of Inconel 625. Evidence of corrosion was seen mostly on the disks and the spindle, and varied from run to run. Deposition of solid material was also seen on the spindle in most runs with acid.

During run 17, the valve was exposed to 400-ppm HCl for about 5.5 hours. The only evidence of corrosion in the disk was the shininess of the passageway. However, in an adjacent blank disk, slight etching of a passageway was. The fluid temperature at the outlet of the control valve for most of the run ranged between 160° and 190° C. It is possible that during short periods, when the fluid temperature was below about 170° C. and the pressure was above 3550 psia, condensation occurred toward the outlet of the disk. For the other runs with acid, temperatures were kept higher to avoid any chance of condensation.

Disks were compared that had been exposed to 1500 ppm HCl for 5 hours and either nitrogen or air. Very little difference is seen in either the disk passageways or the passageway images, suggesting that oxygen did not play a major role in the corrosion of the disk.

The disk used in run 20 was also used in runs 21 and 22 to see the effect of exposure to acid at longer times. Both run 21 and 22 were cut short due to system problems, but the additional 1.5 hours of exposure to acid resulted in noticeably more corrosion in the passageway and on the facing disk. The more severe corrosion is thought to be caused not so much by the longer exposure but by the multiple startups and shutdowns experienced by these disks.

The most severe conditions to which the disks were exposed occurred in run 18. The fluid temperature at the valve outlet was approximately 230°-260° C. throughout the run. One disk showed no evidence of corrosion, though a white solid appears to have blocked three of the four outlet passageways. Surface analysis shows that 91 wt % of this solid consists of the three elements nickel, chlorine, and oxygen, in ratios that approximately correspond to the formula $NiCl_2$—$NiO$.

A second disk showed very severe corrosion with a passageway and also of the facing disk that at the beginning of the run had no passageway. The two disks with passageways were adjacent in this run. Near the inlet of this disk was a hole, approximately 500 microns in diameter, that extended through the disk. Corrosion was also seen on the spindle in this run. The most notable feature was two pits seen near the tip of the spindle. Some deposition is seen along the whole length of this section of the spindle.

The high levels of corrosion seen in the runs discussed were not expected, based on the assumption that corrosion at these conditions is primarily electrochemical, that is, requires ions in a liquid phase. The valve was designed to be isoenthalpic, having no regions of enthalpy change within the valve trim. If truly isoenthalpic, no condensation would occur in the valve. The observations of generally even corrosion across the disks tend to support the claim of being isoenthalpic. However, the very evident corrosion, then, requires an alternative mechanism.

Chemical attack of the valve trim by gaseous HCl is a possible mechanism. The free energy of the reaction of HCl and nickel is negative over the temperature range of the fluid passing through the valve. Equilibrium calculations show a small yield of nickel chloride in the equilibrium products of both the reaction of HCl and nickel and the reaction of HCl and nickel oxide.

In the runs with acids, solid particles were observed both in the separator liquid and in the valve cavity. A sample of the solids from the valve cavity after run 20 was analyzed by two methods. One sample was dissolved in concentrated aqua regia and scanned by ICP-AES. Results should be viewed as qualitative because of using only a single reference standard, which for some elements, differed significantly from the sample and because dissolution was not complete. The results show the following major constituents:

TABLE III

| Nickel | 32 wt % |
| --- | --- |
| Molybdenum | 20 wt % |
| Chromium | 3.3 wt % |
| Iron | 2.5 wt % |

A second sample was leached and tested for anions by ion chromatography. The approximate solid concentration of chloride was found to be 700 ppm and sulfate 200 ppm.

In general, the results from the experiments show that operation with solids is possible, though there are regions in which plugging would occur. Apparently, the valve did perform isoenthalpically, though corrosion was seen in the Inconel 718 valve trim. If the valve had allowed for an enthalpical change so that a considerable portion of the gaseous acid and water had condensed, a much greater rate of corrosion would have been observed.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for treating a gaseous effluent from a supercritical water oxidation reactor containing entrained solids comprising the steps of:
   a) expanding the gas/solids effluent from a first to a second lower pressure at a temperature at which no liquid condenses;
   b) separating the solids from the gas effluent;
   c) neutralizing the effluent to remove any acid gases;
   d) condensing the effluent;

e) purifying the effluent; and f) returning the purified effluent to the supercritical water oxidation reactor.

2. The method in claim 1 wherein the solids are radionuclides.

3. The method in claim 1 wherein the solids are neutralization salts.

4. The method of claim 1 wherein the effluent mixture is expanded within a control valve.

5. The method of claim 1 wherein the solids are separated from the effluent in a device selected from a group consisting of a cyclone separator, a sintered metal filter, an electrostatic precipitator and a fabric filter.

6. The method of claim 1 wherein the expanded effluent is cooled to a temperature in the range of 250°–300° C.

7. The method of claim 1 wherein the effluent is purified by a device selected from a group consisting of spray driers, caustic columns, packed bed scrubbers, tray scrubbers, fluidized bed scrubbers, venturi scrubbers, and spray towers.

8. The method in claim 7 wherein gas released from the effluent is purified by passing through an activated carbon bed.

9. The method of claim 7 wherein the effluent is condensed and recycled after purification.

10. The method of claim 1 wherein the effluent is expanded to a pressure in the range of 200–300 psia.

11. A method for treating gaseous effluent from a supercritical water oxidation reactor to remove entrained solids, acid gases and organics comprising the steps of:

a) passing the effluent through a cooling device to cool the effluent to a range of 400°–500° C.;

b) filtering the effluent through a first separating device;

c) cooling the effluent by expansion through a control valve to a temperature at which no liquid condenses;

d) separating solids from the effluent;

e) passing the effluent through a neutralization device to remove the acid gas portion;

f) condensing the remaining effluent;

g) removing organics from the remaining effluent; and h) returning the effluent to the supercritical water oxidation reactor.

12. The method of claim 11 wherein the cooling device is selected from a group consisting of a heat exchanger and a quenching spray.

13. The method of claim 11 wherein the effluent is passed through the cooling device at a pressure in a range of 3400–4000 psia.

14. The method of claim 11 wherein the solids are filtered from the effluent in a first separating device selected from a group consisting of a cyclone separator and a sintered metal filter.

15. The method of claim 11 wherein the effluent is cooled by expansion to a temperature in the range of 250°–300° C.

16. The method of claim 11 wherein the effluent is expanded to a pressure in the range of 200–300 psia.

17. The method of claim 11 wherein the solids are separated from the effluent by passing through a second separation device selected from a group consisting of an electrostatic precipitator and a fabric filter.

18. The method of claim 11 wherein the acid gas portion is neutralized by passage through a device selected from a group consisting of spray driers, caustic columns, packed bed scrubbers, tray scrubbers, fluidized bed scrubbers, venturi scrubbers, and spray towers.

19. The method in claim 11 wherein the organics are removed from the effluent by passing through an activated carbon bed.

20. A method for treating the effluent from a supercritical water oxidation reactor to remove radionuclides, suspended solids, acid gases, and organics comprising the steps of:

a) passing the effluent through a cooling device selected from a group consisting of a heat exchanger and a direct quench spray to cool the effluent to a range of 400°–500° C. and a pressure in the range of 3400–4000 psia;

b) filtering the effluent through a first separating device selected from the group consisting of a cyclone separator and a sintered metal filter;

c) expanding the effluent through a baffled control value to a pressure in the range of 200–300 psia and a temperature in the range of 250°–300° C.;

d) filtering radionuclides and suspended solids from the effluent by passing the effluent through a second separating device selected from the group consisting of an electrostatic precipitator and a fabric filter;

e) passing the effluent through a neutralization device selected from the group consisting of spray driers, caustic columns, packed bed scrubbers, tray scrubbers, fluidized bed scrubbers, venturi scrubbers, and spray towers to remove the acid gases;

f) condensing the remaining effluent;

g) removing organics from the remaining effluent; and h) returning the effluent to the supercritical water oxidation reactor.

\* \* \* \* \*